July 5, 1949. D. PECCINETTI 2,475,249
VALVE DEVICE FOR LIQUID HEATERS
Filed April 4, 1947 2 Sheets-Sheet 2

Inventor
Domingo Peccinetti,
By
Attorney

Patented July 5, 1949

2,475,249

UNITED STATES PATENT OFFICE 2,475,249

VALVE DEVICE FOR LIQUID HEATERS

Domingo Peccinetti, Mendoza, Argentina

Application April 4, 1947, Serial No. 739,492

1 Claim. (Cl. 236—25)

The present invention refers to a valvular arrangement to be applied to liquid-heaters, the main object of which arrangement is to allow the fuel fluid to be regulated with regard to the liquid which is to be heated.

The arrangement, generally, comprises two synchronous valvular systems, the purpose of one being to regulate the passage of liquid, in accordance with the pressure of same, whereas the purpose of the other, which is actuated by the first mentioned system, is to regulate the passage of the fuel fluid with regard to the circulating liquid.

The invention, due to the excellence of its constructional and operating features, offers evident advantages over all other devices which, with the same or similar end, have been used so far.

In order to enable the invention to be more clearly understood same has been illustrated, as an example and in no ways as a limitation, in attached drawings, in which.

Like numerals stand for like parts throughout the several figures of the drawings.

For greater descriptive clearness, the device will be described in accordance with the following order of its component parts:

(a) Valve system corresponding to the liquid to be heated.

(b) Valve system corresponding to the fuel fluid.

Figure 1:
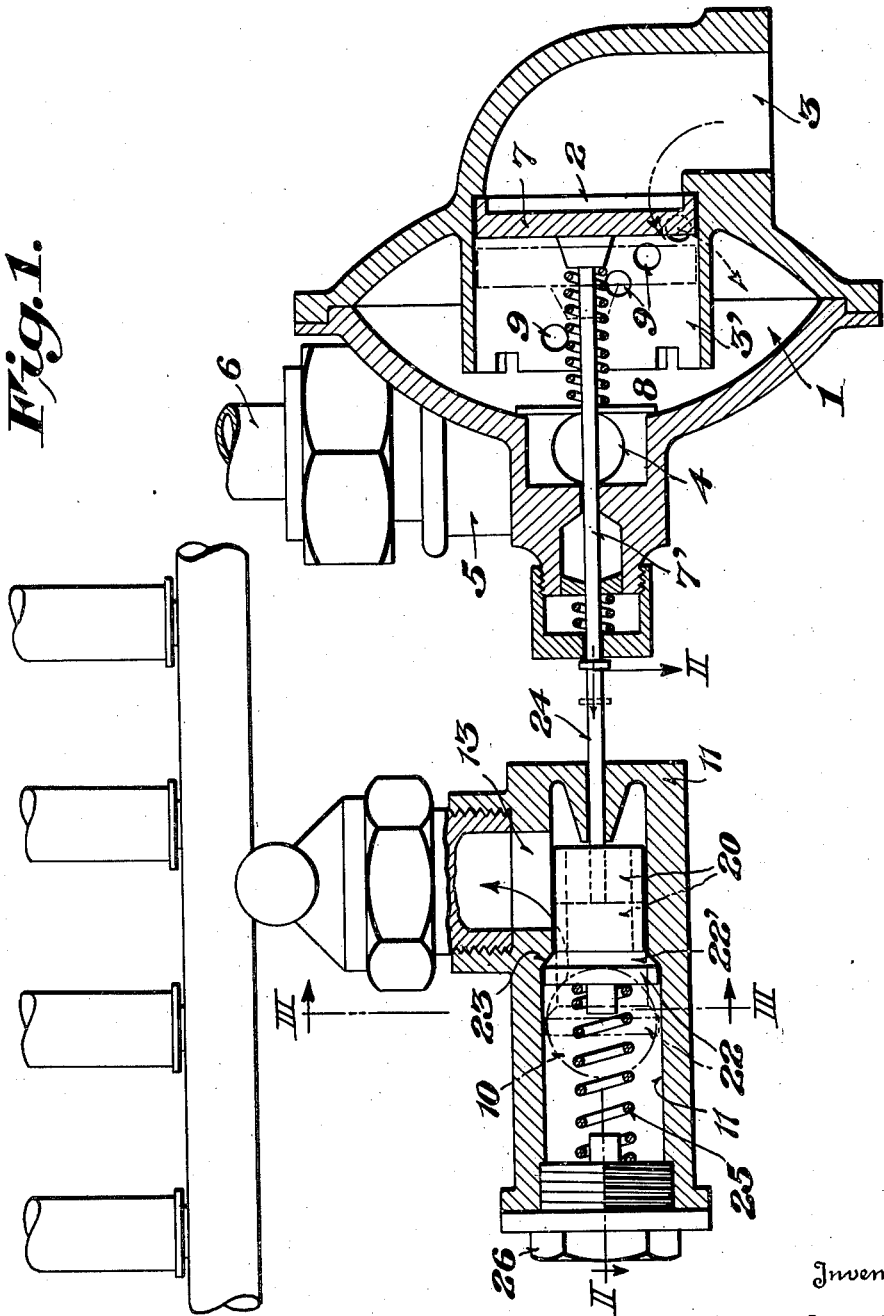
Figure 1 is a cut view of the two-valve system assembly comprising the device according to this invention.
Figure 2:
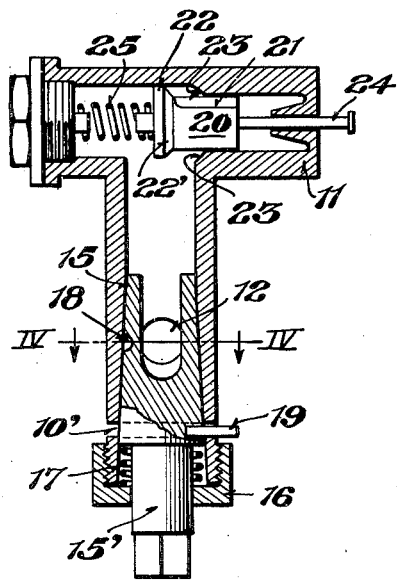
Figure 2 is a cut view through line II—II of Figure 1 of the valvular device corresponding to the regulation of the fuel-fluid.
Figure 3:
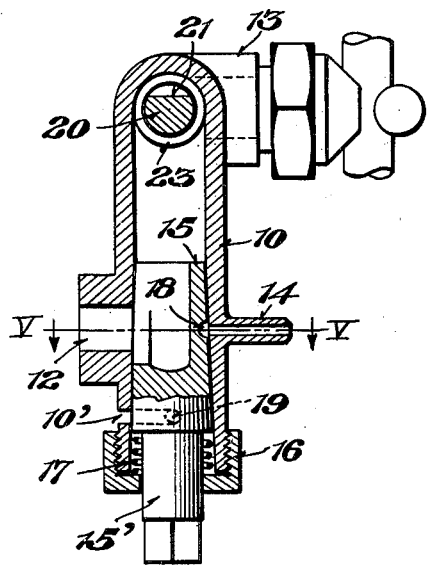
Figure 3 is a 90° angular cut through the device shown in Figure 3, i. e., a cut through line III—III of Figure 1.

With regard to the valve system indicated under (a) above, and as illustrated in Figure 1, it may be observed that said system comprises mainly a chamber 1 provided with an aperture 2 into which the valve feed liquid conduit 3 opens.

Said conduit is provided with an extension 3', housed within said chamber, having a bore 4 to which, by means of coupling 5 the heater coil conduit is connected, said conduit being shown under reference 6.

Extension 3' functions as a guide to plunger 7 which is provided with a stem 7' which, passing through chamber 1, is projected beyond the latter in order to join the fuel valve system, an expansion spring 8 being arranged concentrically with regard to said stem.

Conduit 3' is provided, at different heights with regard to its axis, with a series of bores 9, in such a manner that, as may be seen from Figure 1, the passage of liquid through same is related to the displacement of plunger 7, said displacement being a consequence of the pressure exerted by liquid on said plunger.

The valve system indicated under (b) above, i. e., the fuel valve system, comprises a distributing box, including two inter-connected conduits identified by numerals 10 and 11, said box being communicated with the feed conduit and the fuel burners through openings 12 and 13 provided in conduits 10 and 11, respectively.

On conduit 10 and diametrically opposed to opening 12, a small bore-hole has been provided, extending into conduit 14 and forming the so-called permanent or pilot burner.

In turn, within said conduit 10, a regulation cock has been arranged, comprising a piece 15 of truncated conical shape, provided with a cavity which, beginning at its top end, is extended up to a point lying midways of its length.

This piece 15 is extended towards the outside of the tube in the form of a projection 15' which reaches from the larger base of said piece, passing through gasket 16, threaded on to the end of said tube.

The plane section of stem 15' is smaller than the larger base from which it projects, in such a manner that, concentrically with regard to said stem, and limited by said larger base and the internal surface of the gasket, an elastic expansion means is provided, such as a helical spring 17.

The fuel feed to burner 14 for keeping up the pilot flame, is effected by means of a channel 18 provided in the body of the cock following a transversal plane, said channel describing an approximately 180° course over the surface of piece 15.

In order to limit the angular displacement of the cock, a slot 10' has been provided in conduit 10, through which passes a stem 19 radially projecting from cock 15.

Within conduit 11, as integral part of the distributing box, a valve comprising a substantially cylindrical body 20 has been provided, said valve having one or more lengthwise cuts 21 for permitting the flow of fuel, being provided furthermore, at one of its ends, with a radial projection 22 to which a conical surface 22' has been adapted, cooperating with flange 23 formed within conduit 11.

The body of valve 20 is joined to a control stem 24 projecting outside of the former and connected to the liquid-heating valve system, as may be seen from Figure 1.

The valve is set for its closed position, in the case illustrated, by means of a spring 25 applied between the valve body and one of the extremes of conduit 11, in which a threaded cap has been provided permitting of access to the interior of said conduit.

The operation of the device may be understood from the illustrations and foregoing description; in fact: the liquid which, coming from the main pipe line, circulates through conduit 3, exerts a certain pressure on plunger 7 so that, overcoming the contrary action of spring 8, said plunger is displaced towards the inside of chamber 2, permitting the liquid to be introduced into same through bore-holes 9.

Evidently, the greater the pressure is, the greater will be the displacement of the plunger and, consequently, the number of bore-holes through which the liquid may flow will also be greater, said liquid, after leaving bore 4, to be heated in the heating coil.

Figure 4:
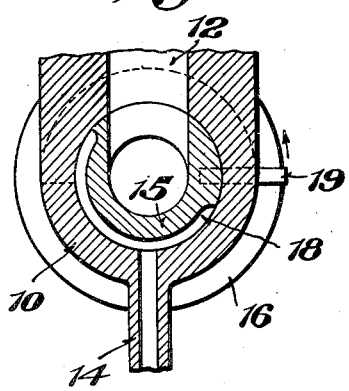
Figure 4 is a cut through line IV—IV of Figure 2 and, finally.

The displacements of plunger 7 are transmitted to the valve body 20 by means of corresponding stems 9' and 24 so that, the cock being in the position shown in Figure 4, the fuel is regulated by means of the displacement of said valve body 20.

The initial lighting of the burners is effected by means of the pilot burner, for which purpose it is merely required to arrange the cock in such a position that channel 18 communicates channel 14 with opening 12.

Figure 5:
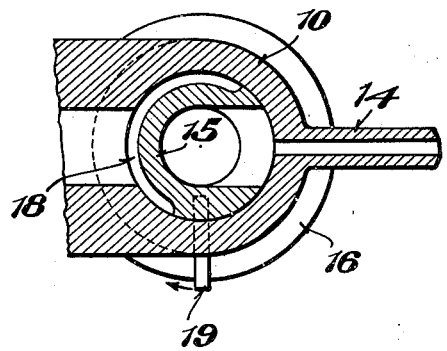
Figure 5 is a cut through line V—V of Figure 3, the valve-stem having been given an 180° turn with regard to said figure, i. e., the valve being in shut position.

The position of the cock as indicated in Figure 5 corresponds to the fuel shut-off of the valve device and, on observing the two positions of stem 19, shown in Figures 4 and 5, it will be seen that they correspond to the maximum open and closed positions respectively, i. e., that said stem operates as a stopping butt.

In view of the fact that attached drawings are to be considered as an explanation only, and in no way as a limitation upon the invention, it is evident that the valve system referred to in same may be subject to alterations of construction and shape, without thereby implying a departure from the essential nature of the invention, as defined in the following claim.

I claim:

A device for controlling the supply of fuel fluid by the supply of a liquid to be heated by said fuel and comprising a chamber, an inlet conduit connected to said chamber, a cylinder fixed within said chamber and having a plurality of openings and bounding with the chamber a space reached by liquid from the inlet only after passage through said openings, a piston slidable in said cylinder, an outlet conduit connected to said chamber and communicating with said inlet only through said openings, yieldable means urging said piston to a position establishing communication only between said cylinder and said outlet, a rod connected to one side of said piston, a second rod engaged at one end by said first rod, a fuel distributing box slidably receiving said second rod, a valve member rigid with said second rod within said box, a second adjustable yieldable means urging said valve member to closed position, a fuel inlet connected to said box, a pilot conduit connected to said box, and valve means operable to admit fuel to said pilot prior to said box and to shut off fuel from said pilot in a completely open position, establishing maximum flow of fuel from said inlet to said box.

DOMINGO PECCINETTI.

REFERENCES CITED

The following references are of record in the file of this patent:

UNITED STATES PATENTS

| Number | Name | Date |
|---|---|---|
| 647,758 | Orr | Apr. 17, 1900 |
| 791,028 | Humphrey | May 30, 1905 |
| 984,440 | Parrott | Feb. 14, 1911 |
| 1,257,933 | Rudd et al. | Feb. 26, 1918 |
| 2,245,060 | Waddell | June 10, 1941 |

FOREIGN PATENTS

| Number | Country | Date |
|---|---|---|
| 74,945 | Austria | Nov. 11, 1918 |
| 403,906 | France | Oct. 6, 1909 |